US008311014B2

(12) United States Patent
Valluri et al.

(10) Patent No.: US 8,311,014 B2
(45) Date of Patent: Nov. 13, 2012

(54) VIRTUAL CARE-OF ADDRESS FOR MOBILE IP (INTERNET PROTOCOL)

(75) Inventors: Vamsidhar Valluri, Fremont, CA (US); Shahriar I. Rahman, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 337 days.

(21) Appl. No.: 12/614,163

(22) Filed: Nov. 6, 2009

(65) Prior Publication Data
US 2011/0110294 A1    May 12, 2011

(51) Int. Cl.
*H04W 4/00* (2009.01)
(52) U.S. Cl. ......... 370/331; 370/354; 455/433; 455/436
(58) Field of Classification Search ............... 455/432.1, 455/433, 436–439, 442; 370/352–354, 328
See application file for complete search history.

(56) References Cited

U.S. PATENT DOCUMENTS

| | | | |
|---|---|---|---|
| 7,171,215 B2 * | 1/2007 | Khouaja et al. ............. | 455/452.2 |
| 7,284,068 B1 * | 10/2007 | Ramalho ........................ | 709/245 |
| 2007/0274266 A1 * | 11/2007 | Oyama et al. .................. | 370/335 |
| 2008/0101315 A1 * | 5/2008 | Bachmutsky .................. | 370/342 |
| 2011/0019610 A1 * | 1/2011 | Oulai et al. .................... | 370/328 |

OTHER PUBLICATIONS

"Cisco Performance Routing (PfR) Overview", Cisco Jan. 2008, Internet PowerPoint presentation at: http://www.cisco.com/en/US/products/ps8787/products_ios_protocol_option_home.html, (34 pages).

"IP Mobility Support for IPv4", Network Working Group, C. Perkins, Ed., Nokia Research Center, Aug. 2002, Internet download at: http://www.ietf.org/rfc/rfc3344.txt?number=3344, (98 pages).

Gundavelli, S., et al., "Multiple Tunnel Support for Mobile IPv4 draft-gundavelli-mip4-multiple-tunnel-support-01.txt", Mobility for IPv4 Working Group, Cisco, Jul. 3, 2009, Internet download at: http://tools.ietf.org/html/draft-gundavelli-mip4-multiple-tunnel-support-01, (17 pages).

Perkins, C. et al., IP Mobility Support for IPv4; rfc 3344.txt :, *Internet Engineering Task Force (IETF) Standard*, Aug. 1, 2002 (022-08-01), sections 2.3, 3.3 and 5. 7 pp.

* cited by examiner

*Primary Examiner* — Christopher Grey
(74) *Attorney, Agent, or Firm* — Blakely Sokoloff Taylor & Zafman, LLP (57) ABSTRACT

An IP (Internet Protocol) session for a mobile node is carried out through the use of a virtual care-of address. A foreign agent sends an agent advertisement to the mobile node to allow the mobile node to choose from a list of IP addresses of the foreign agent. To perform virtual care-of address services, the foreign agent ties the virtual care-of address to a mobile node so that an intelligent and dynamic selection of tunnels to be used for the IP session can occur. Therefore, traffic for an IP session is not limited to transmission over the single particular tunnel that corresponds to an IP address initially selected by the mobile node. Rather, the virtual care-of address shifts the tunneling decision from the mobile node to the foreign agent. Supporting multiple tunnels between home agent and foreign agent allows resilience, redundancy, and service-level differentiation to mobile node traffic without involving the mobile node in the process.

18 Claims, 7 Drawing Sheets

VIRTUAL CARE-OF ADDRESS FOR MOBILE IP (INTERNET PROTOCOL)

BACKGROUND

1. Field

Embodiments of the invention relate to the field of mobile IP (Internet Protocol); and more specifically, to a virtual care-of address assigned to a mobile node.

2. Background

Mobile IP is a protocol described in Request for Comments (RFC) 3344, August 2002, which allows laptop computers or other mobile computing units (referred to as mobile nodes herein) to roam between various sub-networks at various locations, while maintaining Internet and/or WAN connectivity. Mobility agents (e.g., home agent, foreign agent) provide Mobile IP functionality. In a typical Mobile IP network, each mobile node is identified by its home address (assigned by a home agent), regardless of its current point of attachment to the Internet. While situated away from its home, a mobile node is also associated with a care-of address (provided by a foreign agent), which indicates its current point of attachment for reachability. While a mobile node is away from its home and connected to a foreign network it requests registration through the foreign agent to the home agent. If the registration is successful, when the mobile node's home network receives packets addressed to the mobile node, the home agent will send those packets, over a tunnel, to the foreign agent which in turns forwards the packets to the mobile node. When the mobile node is sending packets, the foreign agent may employ reverse-tunneling and send the packets to the home agent who in turn forwards the packets to their destination, or the foreign agent may directly forward the packets to their destinations. When the mobile node is successfully registered, the mobile node has started a Mobile IP session. When the mobile node is deregistered (e.g., the bindings for the mobile node have been removed), the Mobile IP session has ended. The tunnel used between home and foreign agents can be IP-IP or GRE as described in RFC 3344.

Figure 1:
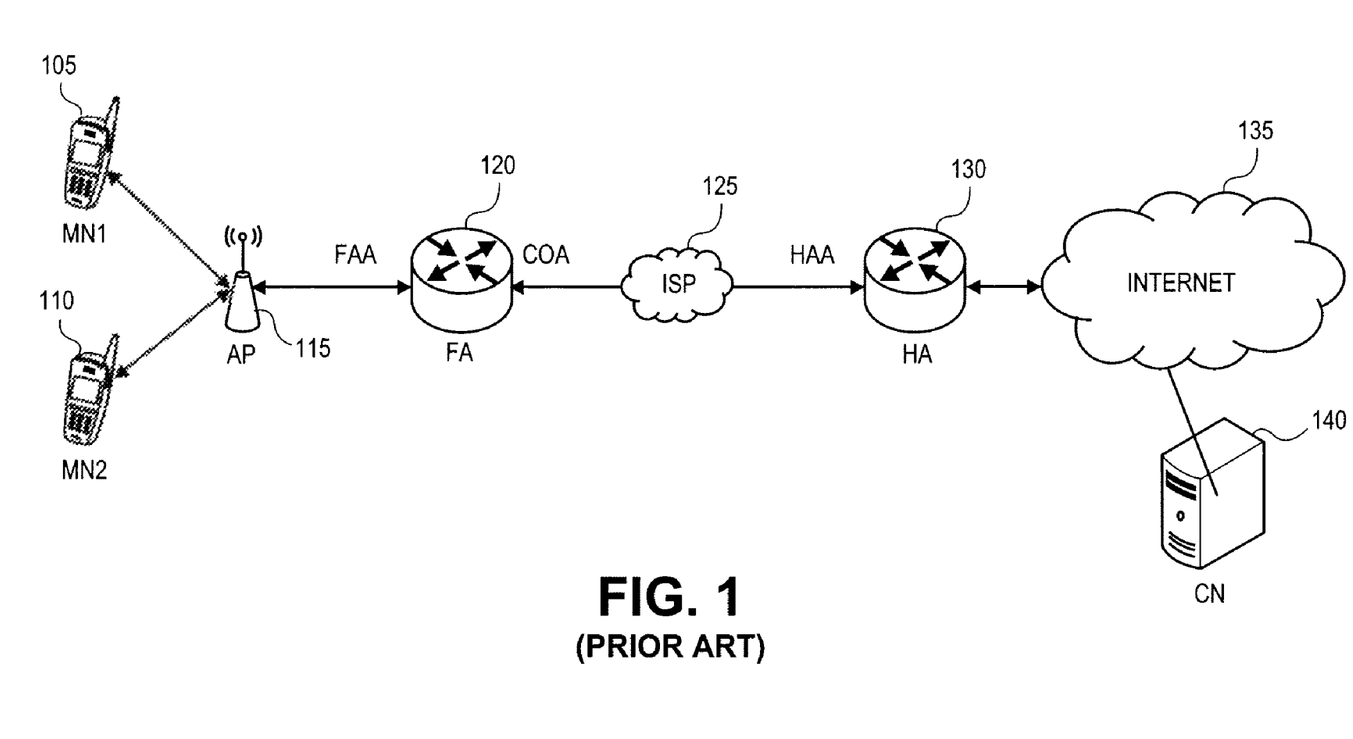
FIG. 1 illustrates a mobile IP network in the prior art.

FIG. 1 presents a sample illustration of the prior art in the field of mobile IP. Mobile node 105 is granted an IP session by way of foreign agent 120 and home agent 130. Foreign agent 120 and home agent 130 can act as routers. In particular, mobile node 105 is coupled to foreign agent 120 through a base station or distributed access point 115. As shown in FIG. 1, a foreign agent address "FAA" is utilized between access point 115 and foreign agent 120. Another mobile node 110 can also be coupled to foreign agent 120 through the same base station 115. Foreign agent 120 serves as the local point of attachment for its coupled to mobile nodes 105, 110. The foreign agent 120 is coupled to a home agent 130 that provides IP connectivity 135, 140 (Internet and corresponding node). In other words, home agent 130 supports IP sessions for mobile nodes 105, 110 through foreign agent 120 and base station 115.

In FIG. 1, foreign agent 120 and home agent 130 are connected by one tunnel serviced by an ISP (Internet Service Provider) 125. The terminating point of the tunnel ending at foreign agent 120 is denoted by a care-of address (CoA) and the other terminating point of the tunnel ending at home agent 130 is denoted by a home agent address (HAA). A CoA is an address of a foreign agent with which a mobile node is registered. In this example, foreign agent 120 only has one CoA. Since mobile nodes 105, 110 had selected the CoA of this foreign agent 120 for their IP sessions, traffic for mobile nodes 105, 110 are directed through this tunnel. Here, there is only one tunnel between foreign agent 120 and home agent 130 by which to carry traffic for IP sessions.

In another example, more than one tunnel can exist between foreign agent 120 and home agent 130. Each of the tunnels can have a different CoA at their foreign agent 120 endpoints. In this situation, mobile nodes 105, 110 each select one of the CoAs at random. It can be the same CoA or two different CoAs. The tunnel used to carry traffic for the IP session of the mobile node is the tunnel attached to the CoA selected by the mobile node. Therefore, the particular tunnel that supports an IP session for a node is dependent on the mobile node's random selection of a CoA. However, the tunnel used can encounter various problems such as overloading or unreliable service from an ISP. Measures are not in place to avoid or remedy the problems that arise in these circumstances.

Interrupting IP connectivity to a mobile node is inconvenient for a mobile node user who relies on his communications device to conduct business, obtain information, etc. Thus, enhancing reliability of IP connectivity for a mobile node is desirable for the user.

SUMMARY

Network agents supporting mobile IP functionality include, among other elements, a foreign agent and a home agent. As noted in the Background, multiple tunnels can exist between the foreign agent and the home agent to support an IP session for a mobile node. In the prior art, the particular utilization of any of these tunnels is directed by a random selection of one of the CoAs at initialization of the mobile node's registration process.

By contrast, the subject invention shifts the control of tunnel selection for IP sessions from the mobile node to the foreign agent. More specifically, the subject invention introduces a virtual CoA to a foreign agent. When a mobile node selects the virtual CoA, rather than one of the regular CoAs that correspond to a particular tunnel (as described in connection with FIG. 1), the foreign agent is able to dynamically select which tunnel is to be utilized to carry data for the IP session. As a result, the multiple tunnels between the foreign agent and the home agent can be more intelligently and efficiently used.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, connections, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). As used herein, a network element (e.g., a router, switch, bridge, etc.) is a piece of networking equipment, including hardware and software that communicatively interconnects other equipment on the network (e.g., other network elements, computer end stations, etc.) Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics. Control plane protocols can also include mobile IP protocol.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

Figure 2:
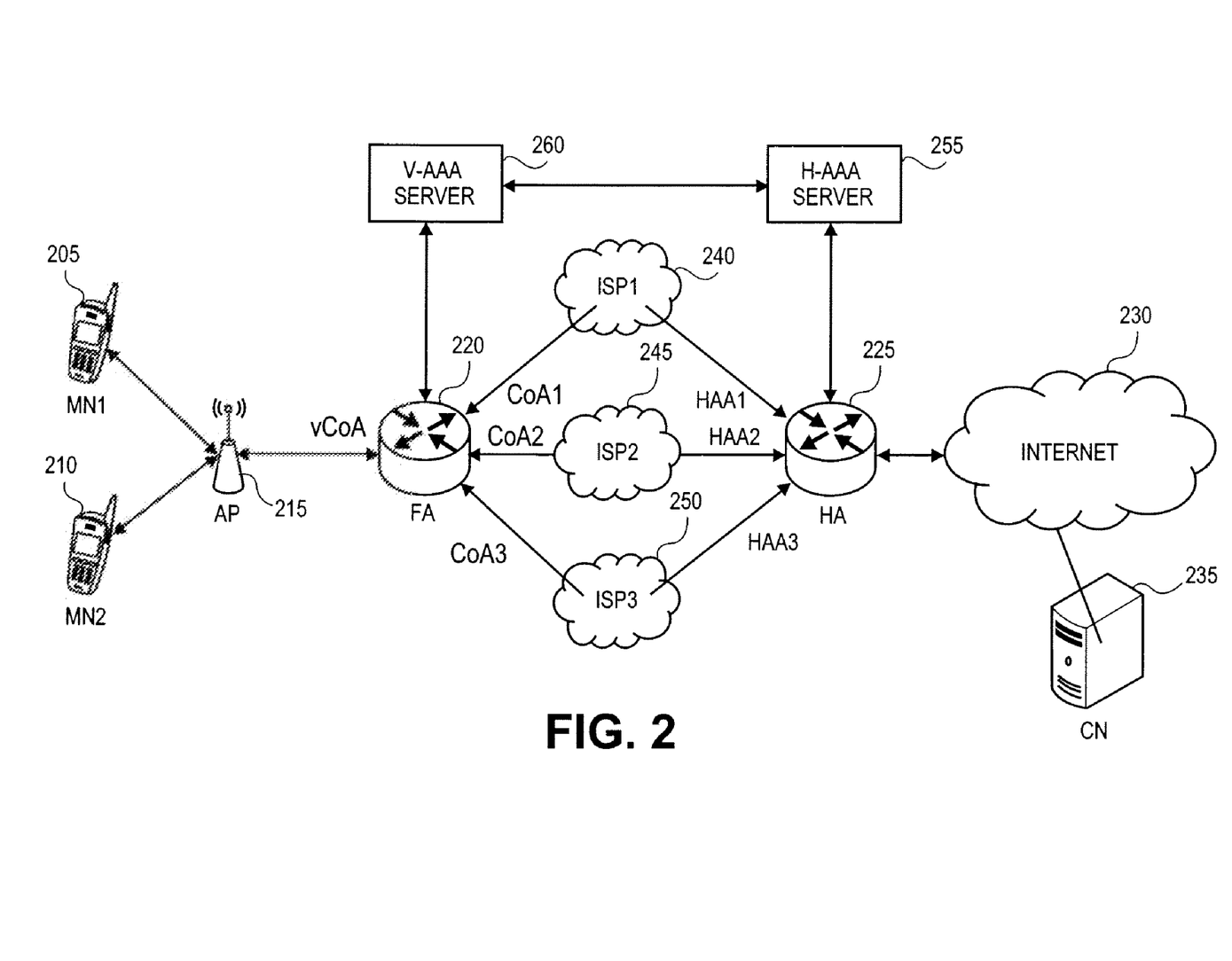
FIG. 2 illustrates an exemplary network supporting the use of a virtual CoA according to one embodiment of the invention.

FIG. 2 illustrates an exemplary network supporting the use of a virtual CoA according to one embodiment of the invention. CoA addresses are advertised in agent advertisement messages from foreign agent 220 to mobile nodes. For an IP session, mobile node 205 selects the virtual CoA ("vCoA") of foreign agent 220 rather than one of CoA1, CoA2, or CoA3. Mobile node 205 maintains only one binding to the vCoA and need only register once using the vCoA. Foreign agent 220 is therefore able to tie the vCoA to any of the tunnels corresponding to CoA1, CoA2, or CoA3 for the IP session of mobile node 205. The dynamic selection of a tunnel by foreign agent 220 for an IP session increases efficiency of traffic among all the tunnels between foreign agent 220 and home agent 225.

Home agent 225 provides an IP session through the Internet 230 and corresponding node 235 to mobile node 205. Home agent 225 is coupled to mobile node 205 through foreign agent 220 and base station or distributed access point 215. Another mobile node 210 can be serviced by home agent 225 through the same foreign agent 220 and access point 215. In addition, other access points (not pictured) can also couple more mobile nodes to foreign agent 220.

Home agent 225 and foreign agent 220 are connected to each other by tunnels. These tunnels can be all of the same type or different, e.g. 2 IP-IP tunnels and 1 GRE tunnel or all 3 IP-IP tunnels. In this example, three tunnels, each serviced by an ISP 240, 245, 250, connect home agent 225 to foreign agent 220. The endpoints for the tunnel serviced by ISP1 240 are CoA1 at the foreign agent 220 end and HAA1 at the home agent 225 end. The endpoints for the tunnel serviced by ISP2 245 are CoA2 and HAA2. The endpoints for the tunnel serviced by ISP3 250 are CoA3 and HAA3.

Since mobile nodes 205, 210 are tied to a vCoA of foreign agent 220, foreign agent 220 is free to use any of the tunnels corresponding to its regular CoAs (CoA1, CoA2, or CoA3) to carry traffic for the IP session of the mobile nodes. A vCoA appears as a regular CoA (IP address) in agent advertisement and registration messages, but can include an extension. For instance, an agent advertisement can take the form of various cases. In one embodiment, foreign agent 220 can send agent advertisements as usual without any extensions specifying a vCoA. In this situation, foreign agent 220 can still offer vCoA services based on locally configured policies or V-AAA policies received during authentication of the mobile node. In another embodiment, foreign agent 220 can send agent advertisement messages with extensions specifying one or more vCoAs. Here, an upgraded mobile node may use the new extensions to prefer this foreign agent over others because it offers a vCoA. If there are no locally configured policies or V-AAA policies, foreign agent 220 can provide vCoA service if mobile node selects vCoA, otherwise, foreign agent 220 would provide regular services. Legacy mobile nodes can ignore extensions and select the CoA randomly. After registration is complete, the binding entry on the foreign agent 220 has information regarding the vCoA selection. If vCoA selection is successful, foreign agent 220 provides vCoA based services for the mobile node. No changes are needed on the mobile node because from mobile node's perspective, it is registered to only one CoA address. For example, foreign agent 220 can direct traffic for a mobile node tied to a vCoA over the first tunnel serviced by ISP1 240 because the second and third tunnels serviced by ISP2 245 and ISP3 250, respectively, are temporarily down. If a mobile node is upgraded to support vCoA capabilities, then the mobile node can intentionally select certain foreign agents that have vCoAs. If a mobile node is not upgraded to support vCoA capabilities, then the mobile node can ignore the vCoA extension and proceed with its random address selection as usual. Even if a non-upgraded mobile node selects a vCoA, foreign agent 220 can deny vCoA service and instead proceed with regular CoA service (by not adding a vCoA extension in the registration message sent to home agent 225).

For an IP session utilizing a vCoA, policies that set forth which CoAs (and corresponding tunnels) should be used for which sessions are stored locally on foreign agent 220 or home agent 225, and/or on home AAA ("H-AAA") server 255 and visited AAA ("V-AAA") server 260. AAA refers to the authentication, authorization, and accounting protocol. One example of a policy is to route all voice traffic over the first tunnel supported by ISP1 240, all video traffic over the second tunnel supported by ISP2 245, and all other types of traffic over the third tunnel supported by ISP3 250. This policy may have been configured in H-AAA server 225 and then sent/conveyed to the agents during a mobile IP registration process. H-AAA server 255 also includes other information about a specific mobile node, i.e., what services the mobile node subscribes to, what policies with respect to sending and receiving traffic have to be enforced on the mobile node, whether the mobile node is upgraded to support vCoA capabilities, etc. H-AAA server 255 transmits at least a subset of its information to V-AAA server 260 so that foreign agent 220 has access to the information as well. Foreign agent 220 queries V-AAA server 260 for information and home agent 225 queries H-AAA server 255 for information.

Figure 3:
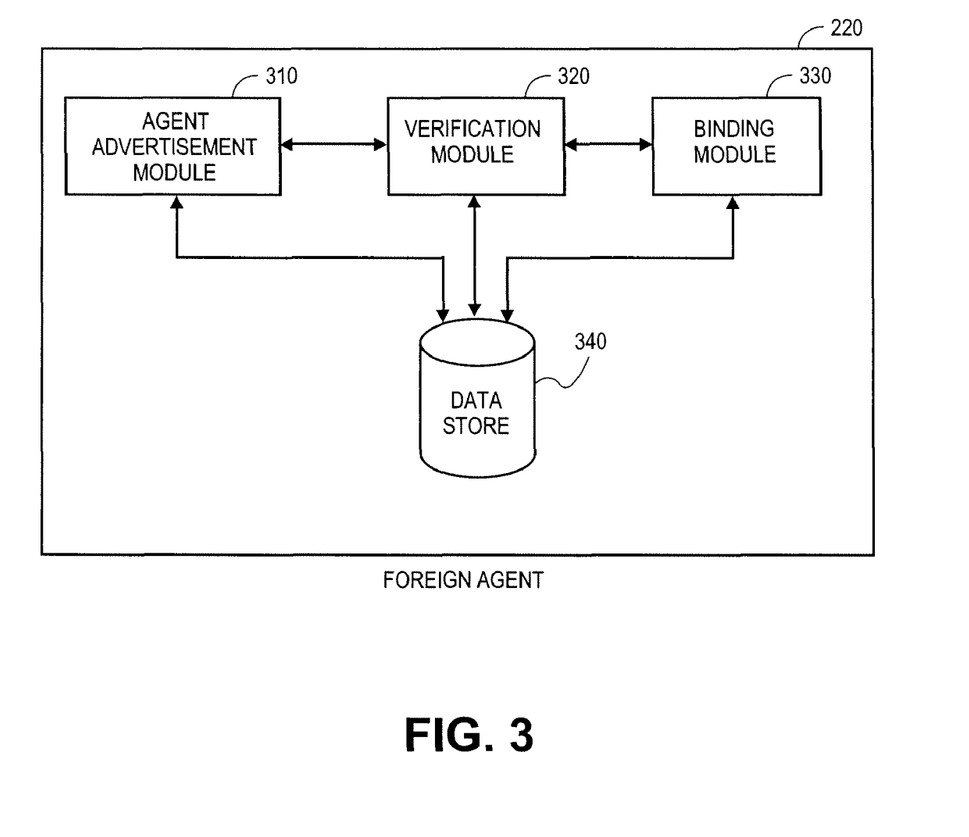
FIG. 3 illustrates an exemplary foreign agent that supports the use of a virtual CoA according to one embodiment of the invention.

FIG. 3 illustrates an exemplary foreign agent that supports the use of a virtual CoA according to one embodiment of the invention. Foreign agent 220 includes various components that support vCoA advertisement, verification, and binding. These components support services enabled by tying a mobile node to a virtual CoA, rather than directly to a regular CoA of foreign agent 220.

Data store 340 includes a list of one or more IP addresses of foreign agent 220 used to register the mobile node. These IP addresses include regular CoAs that identify endpoints of at least one tunnel between foreign agent 220 and a home agent. A regular CoA can be the endpoint of one tunnel or the endpoint of multiple tunnels. These IP addresses also include at least one vCoA that appears as a regular CoA with additional mapping information. A vCoA is still an IP address but the way foreign agent 220 interprets it is different. The vCoA is mapped to multiple tunnel endpoints (CoAs). Data store 340 also includes local policies that characterize types of mobile nodes in terms of their abilities to support services enabled by vCoAs. These policies do not identify any particular mobile node, but rather identify a type of mobile node. Foreign agent 220 can examine this locally stored policy to determine whether a mobile node, based on its type, would appropriately be served by vCoA capabilities. Furthermore, data store 340 can also include policies for binding the vCoA and tunneling traffic for the mobile node's IP session.

Foreign agent 220 includes agent advertisement module 310. Agent advertisement module 310 generates and transmits an agent advertisement either directly to a mobile node or by broadcast to a mobile node network. The agent advertisement lists the IP addresses of foreign agent 220 that a mobile node can select for its IP session. Agent advertisement module 310 obtains these IP addresses from data store 340. An agent advertisement can advertise all regular CoAs of foreign agent 220, plus a vCoA. In the alternative, an agent advertisement can advertise just one IP address, the vCoA, and exclude the regular CoAs from its agent advertisement. An upgraded mobile node may be configured to have a preference for a vCoA so that it can obtain the benefits of dynamic mapping. Otherwise, the mobile node selects an IP address randomly and the selection may or may not be a vCoA.

Foreign agent 220 includes verification module 320. Verification module 320 communicates with agent advertisement module 310 and determines whether an IP address selected by a mobile node is a vCoA or a regular CoA. If the IP address is a vCoA, verification module 320 verifies that the mobile node that selected the vCoA is compatible with the dynamic services enabled by a vCoA. The verification can occur based on information pertaining to the specific mobile node to be registered obtained from a V-AAA server external to foreign agent 220 or information characterizing mobile node type stored in data store 340.

Foreign agent 220 includes binding module 330. Binding module 330 communicates with verification module 320 to determine whether the mobile node should be provided with vCoA services or regular CoA services. If the binding module 330 proceeds with regular CoA services, then the binding module 330 binds the mobile node to the tunnel corresponding to the regular CoA selected by the mobile node. An IP session for the mobile node proceeds over the tunnel identified by the binding. If the binding module 330 proceeds with vCoA services, then the binding module 330 binds the vCoA selected by the mobile node to one or more of foreign agent 220's regular CoAs according to binding policies defined in the V-AAA server or stored locally in data store 340. For example, when a vCoA is selected there could be multiple tunnels (multiple regular CoAs) active for the mobile node at the same time depending on the policies. If mobile node is running two applications (voice and video) at same time, then voice traffic could be sent on one tunnel using CoA1 and video traffic could be sent on another tunnel using CoA2 at the same time. While this method of tunnel selection is application or flow based, other methods of tunnel selection is also possible. An exemplary implementation may use load balancing of traffic of a same flow, mobile node or stream and use sequencing and/or other in order packet delivery mechanisms for reliable forwarding of packets between home and foreign agents. When using a vCoA, foreign agent 220 is able to select which tunnel supports traffic for which mobile node. Since foreign agent 220 is directly connected to the tunnels, foreign agent 220 is in a better position than any mobile node to determine which tunnel is suitable for routing. For example, if an ISP is down, foreign agent 220 can avoid the tunnel serviced by the ISP until it comes back up. All traffic earlier destined to be on the failed tunnel can be seamlessly re-destined on other active tunnels. Therefore, IP sessions provided to mobile nodes are more reliable when a binding determination is dynamically made.

Figure 4A:
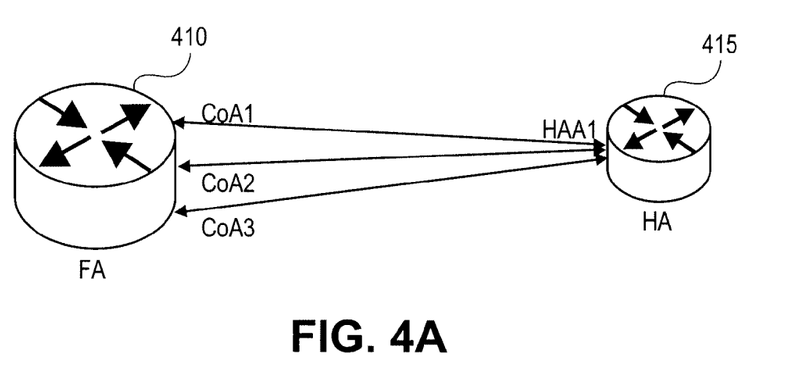
FIGS. 4A and 4B illustrate exemplary foreign agent and home agent tunnel configurations according to one embodiment of the invention.
Figure 4B:
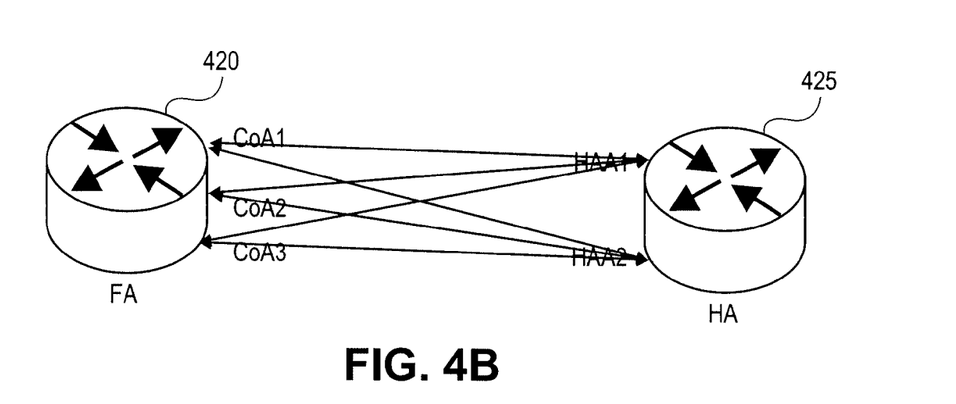

FIGS. 4A and 4B illustrate exemplary foreign agent and home agent tunnel configurations according to one embodiment of the invention. These figures present various manners in which tunnels can be established between a foreign agent and home agent. From the viewpoint of foreign agent 220, when an upstream packet is received on foreign agent 220 from a mobile node, the packet is classified based on the forwarding policies. The result of successful classification is the selection of a particular tunnel for the packet. The packet is then encapsulated based on the tunnel endpoints and tunnel destination route is looked up for forwarding the packet. When a downstream packet is received on a tunnel, tunnel outer header is removed and the inner IP header destination address is used to look up the route. This lookup will result in a mobile node session which has the necessary information to forward the packet to the mobile node on the local point of attachment.

From the viewpoint of home agent 225, when a downstream packet is received on home agent 225 from a corresponding node ("CN") on the Internet, the packet is looked up based on the destination IP address. This results in identifying a mobile node session. The packet is then classified based on the forwarding policies. The result of successful classification is the selection of a particular tunnel for the packet. The packet is then encapsulated based on the tunnel endpoints and the tunnel destination route is looked up for forwarding the packet. When an upstream packet is received on a tunnel, tunnel outer header is removed and the inner IP header destination address is used to look up the route. This lookup will result in nexthop, which has the necessary information to forward the packet to the destination address (which is a corresponding node).

Looking at FIG. 4A, foreign agent 410 has three CoAs (CoA1, CoA2, and CoA3) and home agent 415 has one HAA (HAA1). In this example, three tunnels connect foreign agent 410 and home agent 415 together. All of the tunnels have an endpoint identified by HAA1 at home agent 415. The tunnels have different endpoints at foreign agent 410, identified by CoA1, CoA2, and CoA3. In this case, traffic traveling over any of the tunnels from foreign agent 410 to home agent 415 converge to the same home agent address destination (HAA 1) at home agent 415, but traffic traveling from home agent 415 back to foreign agent 401 can be over any one of the tunnels ending in CoA1, CoA2, or CoA3.

Turning to FIG. 4B, foreign agent 420 has three CoAs (CoA1, CoA2, and CoA3) and home agent 425 has two HAAs (HAA1 and HAA2). In this configuration, each of the CoAs has a path to each of the HAAs. Accordingly, there are six tunnels between foreign agent 420 and home agent 425. The two tunnels corresponding to each of the CoAs can be serviced by different ISPs. For example, traffic for an IP session may travel over the tunnel between CoA1 and HAA1. If the ISP servicing this path unexpectedly fails, then traffic for the IP session can be switched, in the midst of the IP session, to the tunnel between CoA1 and HAA2. Thus, an interruption of the IP session for the mobile node need not occur simply because an ISP fails. For example, a user in the midst of a VoIP (Voice over Internet Protocol) call would not experience an interruption during the switch.

Figure 5:
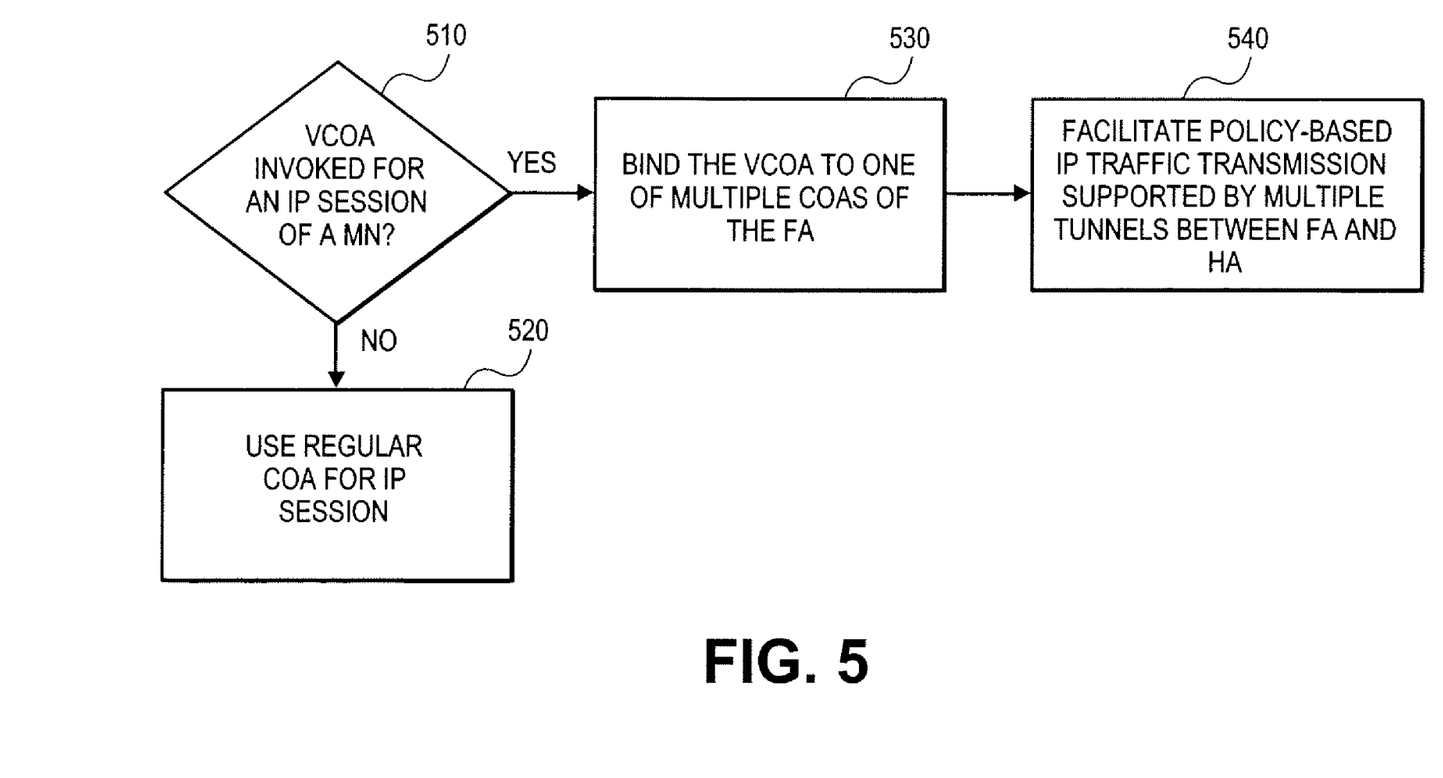
FIG. 5 is a data flow diagram illustrating mobile IP registration according to one embodiment of the invention.

FIG. 5 is a data flow diagram illustrating mobile IP registration according to one embodiment of the invention. The operations of FIG. 5 will be described with reference to the exemplary embodiment of FIG. 2. However, it should be understood that the operations of flow diagrams can be performed by embodiments of the invention other than those discussed with reference to FIG. 2, and the embodiments discussed with reference to FIG. 2 can perform operations different than those discussed with reference to the flow diagrams.

At operation 510, foreign agent 220 determines whether services in connection with vCoA are invoked for an IP session for a mobile node 205. If not, then foreign agent 220 proceeds with regular CoA services for the IP session by tying mobile node 205 to the particular tunnel identified by the regular CoA selected by mobile node 205 (operation 520). Services in connection with vCoA may be invoked by a mobile node's selection of a vCoA listed in the agent advertisement from foreign agent 220. In addition, vCoA services can also be invoked directly by V-AAA server 260 for a mobile node, even if the mobile node did not select a vCoA.

If services in connection with vCoA are invoked for an IP session for a mobile node 205, then foreign agent 220 dynamically binds the vCoA to one or more of regular CoAs of foreign agent 220 (operation 530). Thus, the decision of which tunnel to use for the IP session is not dictated by a selection of a regular CoA by the mobile node, but rather according to circumstances evaluated at foreign agent 220, resulting in a more efficient use of the tunnels. At operation 540, foreign agent 220 facilitates policy-based IP traffic transmission supported by multiple tunneling options between foreign agent 220 and home agent 225. For example, if an ISP becomes inoperable, traffic over the tunnel serviced by the inoperable ISP can be switched to a tunnel serviced by a different ISP that is operable.

Figure 6:
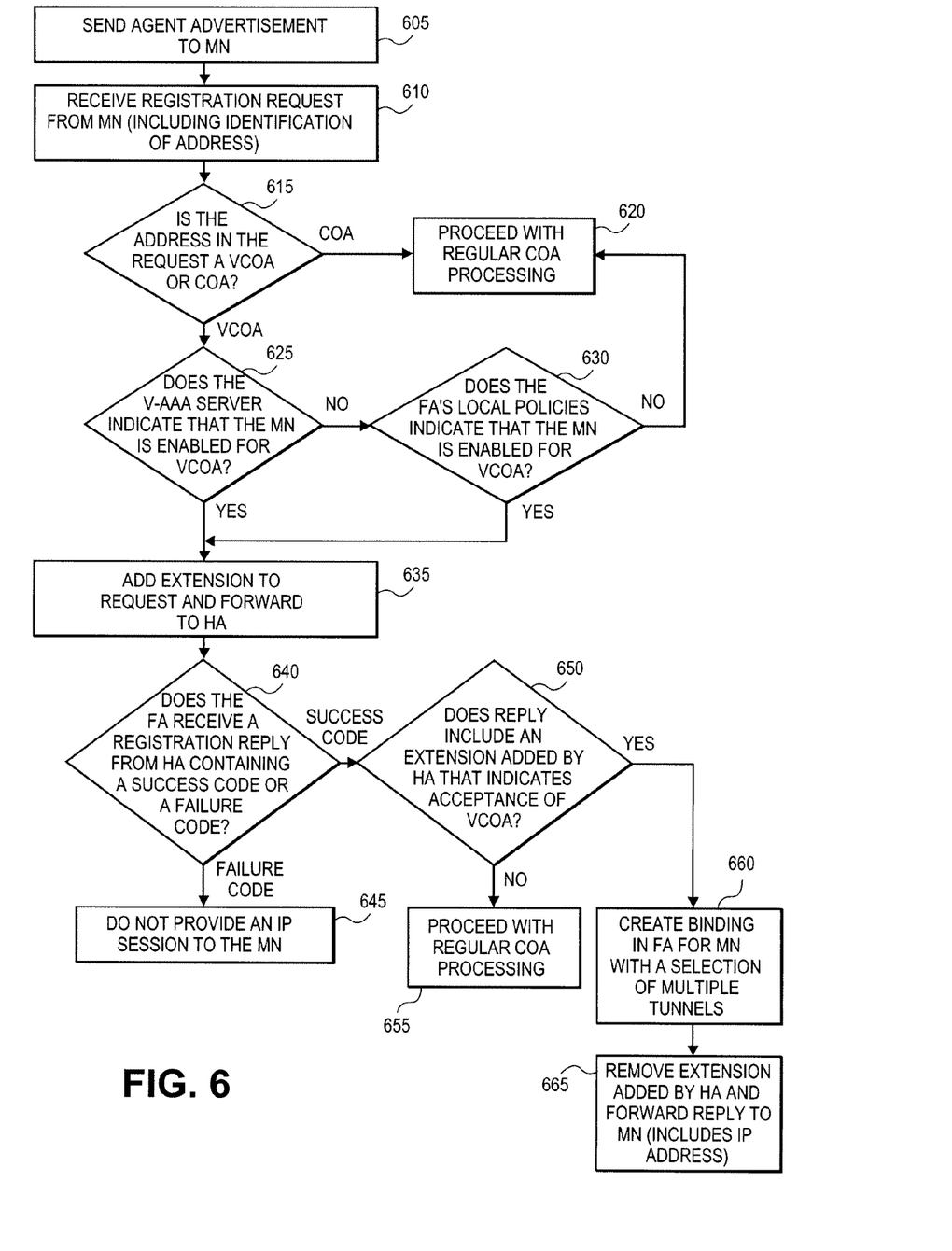
FIG. 6 is another data flow diagram illustrating mobile IP registration according to one embodiment of the invention.

FIG. 6 is another data flow diagram illustrating mobile IP registration according to one embodiment of the invention. The operations of FIG. 6 will be described with reference to the exemplary embodiment of FIGS. 2 and 3. However, it should be understood that the operations of flow diagrams can be performed by embodiments of the invention other than those discussed with reference to FIGS. 2 and 3, and the embodiments discussed with reference to FIGS. 2 and 3 can perform operations different than those discussed with reference to the flow diagrams.

At operation 605, foreign agent 220 sends an agent advertisement to mobile nodes 205, 210. The agent advertisement can be sent in response to a specific request from mobile nodes 205, 210 or a broadcast advertisement to any mobile node on the network. The agent advertisement includes one or more IP addresses, one or more of which is a vCoA. When mobile node 205 selects foreign agent 220 to continue with the registration process, at operation 610, foreign agent 220 receives a registration request from mobile node 205 that identifies the IP address selected by mobile node 205. At operation 615, foreign agent 220 examines the selected IP address in the registration request and determines whether it is a vCoA or a regular CoA. If the IP address is a regular CoA, then at operation 620, foreign agent 220 proceeds with regular CoA processing, i.e., by binding the mobile node to the tunnel identified by the regular CoA endpoint.

If the IP address is a vCoA, then foreign agent 220 and home agent 225 proceed with further operations to determine whether vCoA services should be granted. Foreign agent 220 and home agent 225 do not necessarily grant a registration request from a mobile node for an IP session. At operation 625, foreign agent 220 checks with V-AAA server 260 to see whether it has information pointing to whether mobile node 205 is upgraded to qualify for vCoA services. If V-AAA server 260 does not include any information on mobile node 205, then, at operation 630, foreign agent 220 checks with the local policies stored in data store 340 to determine whether mobile node 205 is upgraded to qualify for vCoA services, e.g., based on the type of mobile node it is. If the local policies in foreign agent 220 indicate that mobile node 205 is of a type that is not compatible with vCoA services, then foreign agent 220 proceeds with regular CoA processing (operation 620).

If the local policies in foreign agent 220 indicate that mobile node 205 is of a type that is compatible with vCoA services, then foreign agent 220 continues with the vCoA verification process. Likewise, if V-AAA server 260 contains information indicating that mobile node 205 is enabled to receive vCoA services, then foreign agent 220 continues with the vCoA verification process. Now that foreign agent 220 has completed its verification process, foreign agent 220 adds an extension to the registration request and forwards the modified registration request to home agent 225 so that home agent 225 can determine whether it will grant the registration request.

If home agent 225 does not understand or support the vCoA extension, then it may ignore the extension. In this situation, home agent 225 is not enhanced to support vCoA services. For example, traffic for a mobile node's IP session may have to be sent and received over multiple tunnels. If home agent 225 does not support this capability, then home agent 225 does not support vCoA services.

At operation 640, foreign agent 220 receives a registration reply ("RRP") from home agent 225 in response to the registration request. However, in some cases, foreign agent 220 may not receive any response from home agent 225. In this situation, the request times out and foreign agent 220 will send an error code to mobile node 205 indicating that the registration request will not be fulfilled. Otherwise, the RRP will include either a success code or a failure code.

If the RRP includes a failure code, then home agent 225 has indicated that it will not accept the registration request at all and therefore foreign agent 220 passes a message to mobile node 205 indicating that the IP session it requested will not be fulfilled (operation 645). If mobile node 205 still seeks IP service, it can send a request to another foreign agent or try again with the same foreign agent 220, e.g., with more credentials.

If the RRP includes a success code, then home agent 225 has indicated that it will provide the IP session to mobile node 205. In addition to the success code, the RRP also includes an extension added by home agent 225 to indicate that home agent 225 accepts the vCoA. Foreign agent 220 examines this extension at operation 650. If the extension is not received from home agent 225, then this indicates that home agent 225 does not accept the vCoA, and at operation 655, foreign agent 220 and home agent will still provide the IP session to mobile node 205, but in accordance with regular CoA procedures rather than vCoA procedures. If the extension indicates that home agent 225 accepts the vCoA, then foreign agent 220 supports the IP session using the vCoA and creates a binding in foreign agent 220 for mobile node 205 to one of a selection of multiple tunnels (operation 660). The binding occurs without direction from mobile node 205. At operation 665, foreign agent 220 removes the extension added by home agent 225 (examined in operation 650) from the RRP and forwards the RRP to mobile node 205. The RRP includes the IP address that mobile node 205 should utilize for the duration of the IP session.

Figure 7:
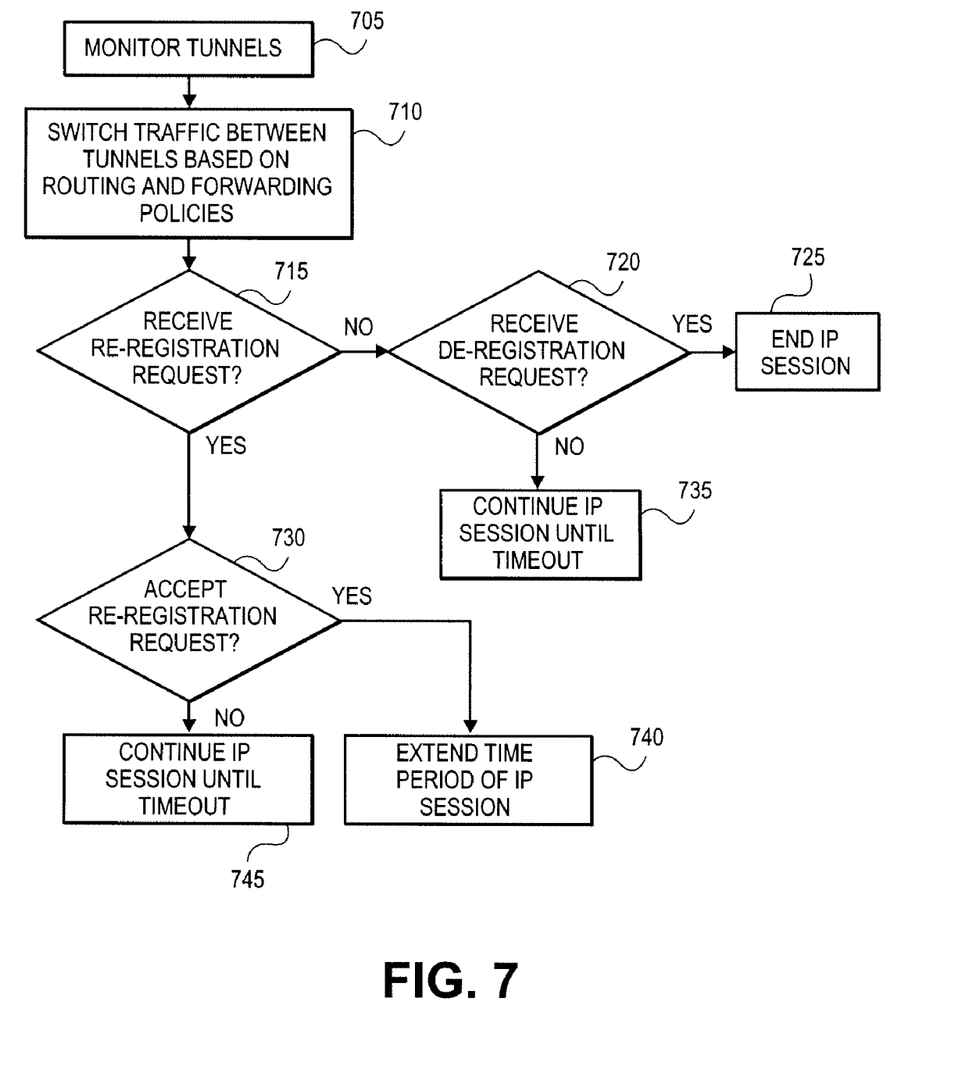
FIG. 7 is a data flow diagram illustrating IP session management according to one embodiment of the invention.

FIG. 7 is a data flow diagram illustrating IP session management according to one embodiment of the invention. The operations of FIG. 7 will be described with reference to the exemplary embodiment of FIG. 2. However, it should be understood that the operations of flow diagrams can be performed by embodiments of the invention other than those discussed with reference to FIG. 2, and the embodiments discussed with reference to FIG. 2 can perform operations different than those discussed with reference to the flow diagrams.

At operation 705, foreign agent 220 monitors the tunnels between foreign agent 220 and home agent 225. Home agent 225 can also monitor these tunnels. At operation 710, foreign agent 220 and home agent 225 switch the traffic traveling on a tunnel for an IP session to a different tunnel based on the monitoring in operation 705 and routing and forwarding policies set forth external to these network elements or internally stored. For instance, traffic for a mobile node can proceed through multiple tunnels, based on intelligent algorithms evaluating path performance (least delay, more bandwidth, minimal packet loss, etc.), load balancing on packet, destination, or flow based algorithms, depending on network failures such as link failure, node failure, routing issues, brownout, blackout, etc., and different Service Level Agreements with different ISPs.

An IP session may have a lifetime that limits the time period of the IP session. For example, the IP session can be limited to 30 minutes. If a mobile node wishes to extend this time period, it can send a re-registration request to foreign agent 220. If foreign agent 220 receives a re-registration request (operation 715) from mobile node 205, then foreign agent 220 and home agent 225 determine whether or not they should accept the re-registration request (operation 730). If they do not accept the re-registration request, then foreign agent 220 and home agent 225 continue to support the IP session for mobile node 205 until the time period has expired (operation 745). If they accept the foreign agent 220 and home agent 225, then foreign agent 220 sends a message to mobile node 205 that they have accepted the request and will extend the time period of the IP session to an amount identified in the re-registration request or a different amount specified in the message (operation 740). Upon expiration of the time period, mobile node 205 must initiate the registration process of FIG. 6 again to obtain a new IP session.

In addition, a de-registration process can occur when a mobile node desires to end its IP session already in progress. At operation 720, foreign agent 220 detects whether it receives a de-registration request. If mobile node 205 does not send this request, then foreign agent 220 and home agent 225 will continue the IP session for mobile node 205 until the time period expires. If mobile node 205 sends a de-registration request to foreign agent 220, then de-registration procedures occur to end the IP session for mobile node 205 (operation 725). The de-registration request causes foreign agent 220 to forward the request to home agent 225. Upon receiving this request, home agent brings down the IP session and communicates to H-AAA server 255 that the IP session is being deactivated. Foreign agent 220 clears its session state bindings of mobile node 205 and sends a confirmation back to mobile node 205 to indicate that the IP session is inactive and the user may now gracefully shut down mobile node 205.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a foreign agent for providing an IP (Internet Protocol) session from a home agent to a mobile node offering a virtual care-of address, the method comprising the steps of:
   sending an agent advertisement to the mobile node to offer to provide the IP session to the mobile node, wherein the agent advertisement includes one or more IP addresses from the foreign agent, one of which is the virtual care-of address, wherein the virtual care-of address is dynamically mapped to one of a plurality of regular care-of addresses in the foreign agent for the IP session, wherein each of the plurality of regular care-of addresses mark the foreign agent's endpoint of each of a plurality of tunnels, wherein the plurality of tunnels are adapted to carry traffic for the IP session between the foreign agent and the home agent that provides a network connection for the IP session;
   receiving a registration request from the mobile node in response to the agent advertisement, wherein the registration request identifies only one IP address, out of the one or more IP addresses, for use in the IP session for the mobile node;
   determining whether services in connection with the virtual care-of address should be provided to the mobile node;
   responsive to determining that the services in connection with the virtual care-of address should not be provided to the mobile node, applying services to the mobile node in connection with one of the plurality of regular care-of addresses in the foreign agent;
   responsive to determining that the services in connection with the virtual care-of address should be provided to the mobile node, performing the following steps:
      selecting one or more of the plurality of tunnels to be bound to the virtual care-of address for the IP session, whereby the selection of the tunnel is enabled due to the mobile node's use of the virtual care-of address rather than one of the plurality of regular care-of addresses which are each necessarily tied to a respective tunnel of the plurality of tunnels; and
      routing the traffic for the IP session through the selected tunnel between the foreign agent and the home agent, whereby utilization and efficiency of the plurality of tunnels for supporting traffic for multiple mobile nodes is improved.

2. The method of claim 1, wherein the step of determining whether services in connection with the virtual care-of address should be provided to the mobile node further comprising the steps of:
   identifying whether the only one IP address is identified as the virtual care-of address or the regular care-of address;
   applying the services to the mobile node in connection with regular care-of addresses in the foreign agent in response to the only one IP address being identified as the regular care-of address;
   determining whether the mobile node is enabled to support the services in connection with the virtual care-of address based on information in a visited AAA (Authentication, Authorization, and Accounting) server coupled to the foreign agent or based on information stored locally in a data store within the foreign agent in response to the only one IP address being identified as the virtual care-of address;
   applying the services to the mobile node in connection with regular care-of addresses in the foreign agent in response to both the visited AAA server and the foreign agent not indicating that the mobile node is enabled to support the services in connection with the virtual care-of address; and
   forwarding the registration request to the home agent in response to the visited AAA server or the foreign agent indicating that the mobile node is enabled to support the services in connection with the virtual care-of address.

3. The method of claim 2, wherein the step of determining whether the mobile node is enabled to support the services in connection with the virtual care-of address further includes the foreign agent checking the visited AAA server prior to checking the data store within the foreign agent.

4. The method of claim 2, wherein the step of determining whether services in connection with the virtual care-of address should be provided to the mobile node further comprising the steps of:
   receiving a registration reply from the home agent in response to the registration request forwarded to the home agent;
   determining whether the registration reply contains a success code or a failure code;
   declining the registration request for the IP session in response to the registration reply containing the failure code;
   determining whether the registration reply also contains an extension added by the home agent that indicates acceptance of the registration request using the virtual care-of address in response to the registration reply containing the success code;
   applying the services to the mobile node in connection with regular care-of addresses in the foreign agent in response to the registration reply not containing the extension that indicates acceptance of the registration request using the virtual care-of address; and determining that services in connection with the virtual care-of address should be provided to the mobile node in response to the registration reply containing both the success code and the extension added by the home agent that indicates acceptance of the registration request using the virtual care-of address.

5. The method of claim 4, wherein the step of selecting further comprising the steps of:
removing the extension added by the home agent from the registration reply; and
forwarding the registration reply without the extension added by the home agent to the mobile node, the registration reply includes an IP address assigned by the home agent for the IP session.

6. The method of claim 1, wherein the selection of one or more of the plurality of tunnels to be bound to the virtual care-of address for the IP session is based on an analysis of the plurality of tunnels by at least one of the foreign agent and the home agent.

7. The method of claim 1, wherein the selection of one of the plurality of tunnels to be bound to the virtual care-of address for the IP session is based on a policy governing the mobile node established upon initialization and entry of the mobile node to the foreign agent's network.

8. The method of claim 1, wherein the agent advertisement includes only one IP address which is the virtual care-of address from the foreign agent.

9. The method of claim 1, wherein the agent advertisement includes a plurality of IP addresses, one of which is the virtual care-of address and the remainder of which are one or more of the plurality of regular care-of addresses from the foreign agent.

10. The method of claim 1, further comprising the step of:
receiving a re-registration request from the mobile node prior to expiration of a lifetime of the IP session to extend the lifetime of the IP session.

11. The method of claim 1, wherein the step of selecting further comprising the step of:
dynamically switching among the plurality of tunnels to carry the traffic during the IP session.

12. A system for supplying network services to a mobile node based on a virtual care-of address comprising:
a first network element to act as a foreign agent coupled to a mobile node;
a second network element to act as a home agent coupled to the foreign agent and that provides an IP (Internet Protocol) session to the mobile node by way of the foreign agent;
a plurality of tunnels to carry data between the first network element and the second network element, wherein each of the plurality of tunnels has a first endpoint at the first network element identified by a regular care-of address and a second endpoint at the second network element identified by a home agent address, wherein the first network element supplies the mobile node with a virtual care-of address, rather than any of the plurality of regular care-of addresses that are each tied to a specific tunnel of the plurality of tunnels, and wherein the first network element binds, by choice of the first network element, the virtual care-of address to one or more of the plurality of tunnels for the IP session for the mobile node, whereby enabling the first network element to bind the virtual care-of address to the one or more tunnels of the plurality of tunnels improves utilization and efficiency of the plurality of tunnels for supporting traffic for multiple mobile nodes;
a home AAA (Authentication, Authorization, and Accounting) server coupled to the second network element that includes information regarding policies of the mobile node and services subscribed by the mobile node; and
a visited AAA server coupled to the home AAA server and the first network element that receives the information from the home AAA server and communicates the information to the first network element when requested by the first network element, wherein the information specifies whether the mobile node is upgraded to support services of the virtual care-of address.

13. The system of claim 12, wherein the first network element and the second network element receive and send traffic over more than one of the plurality of tunnels for the IP session.

14. The system of claim 12, wherein the first network element dynamically switches among the plurality of tunnels during the IP session.

15. A network element, to act as a foreign agent, to provide an IP (Internet Protocol) session between another network element acting as a home agent to a mobile node by way of a virtual care-of address, the network element comprising:
a data store to store:
a list of one or more IP addresses used by the network element;
local policies characterizing types of mobile nodes in terms of their abilities to support services enabled by virtual care-of addresses;
a processor coupled to the data store, the processor adapted to:
transmit an agent advertisement to the mobile node which offers the mobile node the IP session through a choice of one out of the one or more IP addresses obtained from the data store and listed in the agent advertisement, one of which is the virtual care-of address, wherein the virtual care-of address is dynamically mapped to one of a plurality of regular care-of addresses in the foreign agent for the IP session, wherein each of the plurality of regular care-of addresses mark the foreign agent's endpoint of each of a plurality of tunnels;
verify that the mobile node is upgraded to support the services enabled by virtual care-of addresses based on at least one of the local policies stored in the data store and information received from a server external to the network element; and
bind the virtual care-of address that identifies the mobile node with one of the plurality of tunnels between the network element and the another network element for the IP session, whereby establishing the binding within the network element improves utilization and efficiency of the plurality of tunnels for supporting traffic for multiple mobile nodes.

16. The network element of claim 15, wherein the processor is adapted dynamically switch among the plurality of tunnels during the IP session without intervention by the mobile node.

17. The network element of claim 15, wherein the network element and the another network element receive and send traffic over more than one of the plurality of tunnels for the IP session.

18. The network element of claim 15, wherein the data store to further store guidelines for binding the virtual care-of address and the plurality of tunnels.

* * * * *

UNITED STATES PATENT AND TRADEMARK OFFICE
CERTIFICATE OF CORRECTION

PATENT NO.        : 8,311,014 B2
APPLICATION NO.   : 12/614163
DATED             : November 13, 2012
INVENTOR(S)       : Valluri et al.

It is certified that error appears in the above-identified patent and that said Letters Patent is hereby corrected as shown below:

On the Face Page, in Field (56), under "OTHER PUBLICATIONS", in Column 2, Line 11, delete "5. 7 pp." and insert -- 5.1, 7 pp. --, therefor.

Signed and Sealed this
Fifth Day of March, 2013

Teresa Stanek Rea
*Acting Director of the United States Patent and Trademark Office*